United States Patent
Yeganeh et al.

(10) Patent No.: US 12,544,707 B2
(45) Date of Patent: Feb. 10, 2026

(54) BED REGENERATION USING LOW VALUE STEAM

(71) Applicant: ExxonMobil Technology and Engineering Company, Annandale, NJ (US)

(72) Inventors: Mohsen S. Yeganeh, Newtown, PA (US); John W. Fulton, Jr., Annandale, VA (US); Sundaresan Narayanan, Annandale, NJ (US); Timothy A. Barckholtz, Whitehouse Station, NJ (US); Simon C. Weston, Annandale, NJ (US)

(73) Assignee: EXXONMOBIL TECHNOLOGY AND ENGINEERING COMPANY, Spring, TX (US)

( * ) Notice: Subject to any disclaimer, the term of this patent is extended or adjusted under 35 U.S.C. 154(b) by 876 days.

(21) Appl. No.: 17/647,393

(22) Filed: Jan. 7, 2022

(65) Prior Publication Data
US 2022/0233996 A1    Jul. 28, 2022

Related U.S. Application Data

(60) Provisional application No. 63/140,640, filed on Jan. 22, 2021.

(51) Int. Cl.
*B01D 53/14* (2006.01)
*F01K 25/10* (2006.01)

(52) U.S. Cl.
CPC ..... *B01D 53/1475* (2013.01); *B01D 53/1425* (2013.01); *B01D 53/1493* (2013.01);
(Continued)

(58) Field of Classification Search
CPC ............ B01D 53/1425; B01D 53/1475; B01D 53/1493; B01D 2252/204;
(Continued)

(56) References Cited

U.S. PATENT DOCUMENTS

| | | |
|---|---|---|
| 3,758,404 A | 9/1973 | Clonts |
| 6,402,818 B1 | 6/2002 | Sengupta et al. |

(Continued)

FOREIGN PATENT DOCUMENTS

| | | | |
|---|---|---|---|
| WO | 2017055615 A1 | 4/2017 | |
| WO | WO-2018207633 A1 * | 11/2018 | ............ B01D 53/08 |
| WO | 2022/159919 A1 | 7/2022 | |

OTHER PUBLICATIONS

Translation of WO2018207633A1, accessed Nov. 4, 2024 (Year: 2018).*

(Continued)

*Primary Examiner* — Jennifer Dieterle
*Assistant Examiner* — Phillip Y Shao
(74) *Attorney, Agent, or Firm* — Shook, Hardy & Bacon L.L.P.

(57) ABSTRACT

Systems and methods are provided for regenerating a bed containing absorbed and/or adsorbed $CO_2$ using a low value steam stream. The steam stream can have a pressure of 10 kPa-a to 50 kPa-a and a temperature of 46° C. to 81° C. The steam stream can be used to displace $CO_2$ from the bed, resulting in formation of a low pressure stream including water vapor and $CO_2$. The stream containing water vapor and $CO_2$ is then passed through a liquid ring pump that includes an associated ring cooler. The ring pump provides the suction necessary to draw the low value steam stream through the bed to displace the $CO_2$. Due to the nature of operation of the liquid ring pump, the majority of water in the steam containing $H_2O$ and $CO_2$ can be removed within (Continued)

the liquid ring pump, resulting in production of a stream comprising 90 vol % or more of $CO_2$ at a pressure of 90 kPa-a or more. An example of a bed that can be regenerated using a low value steam stream is a bed that corresponds to a liquid amine that is coated on/covering/impregnated into a porous solid, so that the liquid amine remains substantially in place during a cycle of sorption and desorption of $CO_2$.

18 Claims, 3 Drawing Sheets

(52) U.S. Cl.
CPC ...... *F01K 25/103* (2013.01); *B01D 2252/204* (2013.01); *B01D 2257/504* (2013.01); *B01D 2258/0283* (2013.01)

(58) Field of Classification Search
CPC ...... B01D 2257/504; B01D 2258/0283; B01D 53/0438; B01D 53/0446; B01D 53/0462; B01D 53/0476; B01D 2259/4009; B01D 2259/65; F01K 25/103; F02C 6/10
See application file for complete search history.

(56) References Cited

U.S. PATENT DOCUMENTS

| | | |
|---|---|---|
| 11,439,927 B2 | 9/2022 | Ide et al. |
| 2011/0005389 A1 | 1/2011 | Webley et al. |
| 2012/0125194 A1* | 5/2012 | Caram ............ B01D 53/62 96/115 |
| 2014/0105809 A1 | 4/2014 | Okumura et al. |
| 2015/0190777 A1* | 7/2015 | Shen ............ B01D 53/96 252/190 |
| 2016/0136565 A1 | 5/2016 | Okumura et al. |
| 2018/0272266 A1* | 9/2018 | Sprachmann ...... B01J 20/28011 |
| 2019/0366264 A1* | 12/2019 | Kim ............ B01D 65/10 |
| 2020/0147543 A1 | 5/2020 | Yeganeh et al. |
| 2020/0147545 A1 | 5/2020 | Yeganeh et al. |

OTHER PUBLICATIONS

Zoelle, A., et al., "Cost and performance baseline for fossil energy plants, vol. 1a: bituminous coal and natural gas to electricity", National Energy Technology Laboratory (NETL), pp. 167-240 (Jul. 6, 2015).

International Search Report and Written Opinion received for PCT Application No. PCT/US2022/070092, mailed on Apr. 26, 2022, 13 Pages.

Bilek et al.,"Plasma modified surfaces for covalent immobilization of functional biomolecules in the absence of chemical linkers: towards better biosensors and a new generation of medical implants.", Biophysical Reviews 2010, 2:55-65.

Stepankova et al., "Strategies for Stabilization of Enzymes in Organic Solvents", ACS Catalysis 2013, 3:2823-2836.

Kawakami et al., "Immobilization of glucose oxidase on polymer membranes treated by low-temperature plasma", Biotechnology and Bioengineering 1988, 32:369-373.

* cited by examiner

BED REGENERATION USING LOW VALUE STEAM

CROSS-REFERENCE TO RELATED APPLICATIONS

This application is related to and claims the benefit of priority to U.S. Provisional Application No. 63/140,640 filed Jan. 22, 2021, which is herein incorporated by reference in its entirety.

FIELD

Systems and methods are provided for regenerating a bed of absorbent or adsorbent using low temperature steam at pressures below ~50 kPa-a.

BACKGROUND

Mitigation of $CO_2$ emissions from various types of combustion devices is an area of ongoing interest. For combustion devices that use hydrocarbons as fuel, a common strategy for reducing $CO_2$ emissions is to attempt to capture the $CO_2$ from the combustion flue gas stream prior to exhausting the flue gas to the environment. The current commercial standard for performing such $CO_2$ capture is to use an amine scrubber tower. An amine scrubber tower operates using a dilute amine absorbent that absorbs $CO_2$ from a gas stream. The amine can then be regenerated to release the $CO_2$ in a separate regeneration tower. Unfortunately, amine scrubber and regeneration towers are costly to build and to operate. For example, the operation of the towers consumes substantial amounts of power. Therefore, more fuel needs to be generated to operate the amine towers, resulting in additional $CO_2$ production that offsets some of the benefits of the amine towers.

An alternative to using a liquid amine is to use a solid adsorbent for separating $CO_2$ from a gas stream. Materials capable of acting as adsorbents include zeolites and mesoporous metal-organic-framework (MOF) materials. Unfortunately, the desorption methods for desorbing $CO_2$ from conventional adsorbents are also costly, which is why amine towers have remained a favored choice for $CO_2$ capture applications.

More recently, U.S. Patent Application Publication 2020/0147545 described systems and methods for supporting a liquid amine absorbent on a high surface area material. This "porous liquid" can then be used in a manner similar to an adsorbent for removal of $CO_2$ from a gas stream.

It would be desirable to have systems and methods to reduce or minimize the costs associated with regeneration of a $CO_2$ absorbent or adsorbent. Preferably, such systems and methods can be used with $CO_2$ absorbent or adsorbent configurations that allow for separation of $CO_2$ from industrial scale gas flows.

An NETL case study (US Department of Energy, National Energy Technology Laboratory, "Cost and Performance Baseline for Fossil Energy Plants, Volume 1a: Bituminious Coal (PC) and Natural Gas to Electricity, Jul. 6, 2015, case 31A) describes a near idealized energy requirements for operating a power plant, such as a combined cycle natural gas power plant, while also performing carbon capture.

SUMMARY

In an aspect, a method for desorption of $CO_2$ from a sorbent bed is provided. The method includes exposing a steam stream having a steam pressure of 4 kPa to 50 kPa to a sorbent bed having sorbed $CO_2$ and a first average sorbent bed temperature of 0° C. to 150° C. to form an exhaust stream containing steam and at least a portion of the sorbed $CO_2$, the steam stream having a temperature of 30° C. to 81° C. prior to entering the sorbent bed. Additionally, the method includes passing at least a portion of the exhaust stream through a liquid ring pump having an associated ring cooler to form a $CO_2$-containing stream containing 90 vol % or more $CO_2$.

Optionally, the method further includes exposing an input stream containing 0.01 vol % to 25 vol % $CO_2$, relative to a volume of the input stream, to the sorbent bed at a second average sorbent bed temperature of 0° C. to 150° C. to adsorb $CO_2$, absorb $CO_2$, or a combination thereof, and to form a $CO_2$-depleted stream including 10 mol % or less of the $CO_2$ from the input stream.

Optionally, the absorbent can correspond to an absorbent liquid infused or encapsulated on a solid surface, covering a solid surface, or a combination thereof. Optionally, the absorbent can have a Performance Index of greater than 150 $m^{-1}$. Optionally, the absorbent can be an amine. Optionally, the solid surface can have a surface area of 0.001 $m^2/g$ to 45 $m^2/g$.

In another aspect, a system for sorption and desorption of $CO_2$ using a sorbent bed is provided. The system includes a sorbent bed including an adsorbent, an absorbent, or a combination thereof. The sorbent bed can include a first inlet, a steam inlet, a first outlet, and a desorption outlet. The system further includes a combustion zone having a combustion outlet. The system further includes a heat exchanger having a hot fluid inlet in fluid communication with the combustion outlet, a cooled fluid outlet, a water inlet, and a steam outlet. The first inlet of the sorbent bed can be in fluid communication with the cooled fluid outlet. The steam inlet of the sorbent bed can be in fluid communication with the steam outlet of the heat exchanger. Additionally, the system includes a liquid ring pump having an associated ring cooler in fluid communication with the desorption outlet.

Optionally, the absorbent can correspond to an absorbent liquid infused or encapsulated on a solid surface, covering a solid surface, or a combination thereof. Optionally, the absorbent can have a Performance Index of greater than 150 $m^{-1}$. Optionally, the absorbent can be an amine. Optionally, the solid surface can have a surface area of 0.001 $m^2/g$ to 45 $m^2/g$.

Optionally, the steam inlet of the sorbent bed can be in indirect fluid communication with the steam outlet of the heat exchanger via one or more steam turbines.

DETAILED DESCRIPTION

All numerical values within the detailed description and the claims herein are modified by "about" or "approximately" the indicated value, and take into account experimental error and variations that would be expected by a person having ordinary skill in the art.

Overview

In various aspects, systems and methods are provided for regenerating a bed containing absorbed and/or adsorbed $CO_2$. The systems and methods can take advantage of several unexpected synergies to allow a $CO_2$ absorbent/adsorbent bed to be regenerated using a low value steam stream. The steam stream can have a pressure of 4 kPa-a to 50 kPa-a (or 4 kPa-a to 40 kPa-a, or 20 kPa-a to 50 kPa-a) and a temperature of 30° C. to 81° C. (or 30° C. to 70° C., or 55° C. to 81° C.). Preferably, the steam stream can include 90 vol % or more steam. The steam stream can be used to displace $CO_2$ from the bed, resulting in formation of a low pressure stream including water vapor and $CO_2$. The stream containing water vapor and $CO_2$ is then passed through a liquid ring pump that includes an associated ring cooler. The ring pump provides the suction necessary to draw the low value steam stream through the bed to displace the $CO_2$. The suction pressure provided by the liquid ring pump is lower than the steam pressure. For example, the liquid ring pump can operate at a pressure of 20 kPa-a when the steam stream is at 30 kPa-a. More generally, the liquid ring pump can operate at a pressure that is lower than the steam pressure by 1.0 kPa or more, or 10 kPa or more, such as up to 40 kPa lower than the steam pressure or possibly still lower. Due to the nature of operation of the liquid ring pump, the majority of water in the steam containing $H_2O$ and $CO_2$ can be removed within the liquid ring pump, resulting in production of a stream comprising 90 vol % or more (or 95 vol % or more) of $CO_2$ at a pressure of 90 kPa-a or more (or 100 kPa-a or more). Optionally but preferably, the low value steam stream can be used for regeneration of a bed that corresponds to a liquid amine that is coated on/covering/impregnated into a porous solid, so that the liquid amine remains substantially in place during a cycle of sorption and desorption of $CO_2$.

Conventionally, selecting just the conditions for sorption of $CO_2$ or just the conditions for desorption of $CO_2$ during a regeneration step is relatively straightforward. For sorption (adsorption or absorption), the goal is to select conditions that provide a high likelihood of sorption when a $CO_2$ encounters an adsorption or absorption site. For desorption, the goal is to select conditions that allow substantially all of the $CO_2$ to desorb during a regeneration step.

Typically, the difficulties in setting up a commercial scale adsorption/desorption cycle are related to selecting a combination of adsorption and desorption conditions that 1) provide good adsorption, 2) provide good desorption during regeneration, 3) reduce or minimize the energy costs associated with the adsorption/desorption cycle, and 4) reduce or minimize the amount of time that an adsorbent bed requires for regeneration. Selecting a combination of adsorption and desorption conditions that balance all of these factors remains an ongoing challenge.

Conventionally, there are two main types of strategies for desorption of $CO_2$ during regeneration of a sorbent (adsorbent or absorbent) bed. One strategy is to use steam during the desorption step, where the steam is at a higher temperature than the sorption step. In addition to raising the temperature so that the steam can act as a sweep gas, water in a steam sweep gas can also displace $CO_2$ to further facilitate desorption. In order to decrease the time needed for heating the bed and/or for the desorption of $CO_2$, steam sweep gas can typically be at a pressure substantially greater than 100 kPa. While this can be effective, using steam to swing the temperature of a sorbent bed also has some drawbacks. First, generation of steam to heat the sorbent bed requires a substantial amount of energy. The high pressure and temperature steam which can be used to generate electricity is normally taken from the input of a steam turbine in a power plant, substantially reducing the power output. In addition, the need to then rapidly cool the bed to be ready for the next sorption step means that a substantial amount of waste heat will be lost. Additionally, after desorbing the $CO_2$, if the $CO_2$ is going to be sequestered, the $CO_2$ needs to be separated from the water in the desorption output gas. This typically means cooling the gas stream to condense the water, using refrigeration approaches. Such cooling corresponds to another temperature cycle that requires still more energy that will basically be lost as waste heat to the environment.

As an alternative to temperature swings, a combination of substantial pressure swing and sweep gas can be used to desorb $CO_2$ from a sorbent. One advantage of using pressure swings is that large pressure changes can be achieved relatively rapidly, which can reduce the amount of time the reactor spends outside of the sorption step. However, when attempting to limit the temperature swing, it is conventionally believed that pressure swings on the order of 200 kPa or more (relative to the adsorption step) are needed in order to facilitate desorption. A steam sweep gas can also be used in conjunction with pressure swings. In order to facilitate displacement by $H_2O$, it is conventionally believed to be desirable for the sweep gas to be at a higher pressure than 100 kPa-a, in order to increase the density of available $H_2O$ for displacing $CO_2$. As noted above, while such a sweep gas can be effective for desorption of $CO_2$, additional separations are then required to recover a high purity $CO_2$ stream from the mixture of $CO_2$ and $H_2O$ in the desorption exhaust.

Combination of temperature swing and vacuum to regenerate the bed, in principle, can also be applied. In this case, low vacuum pressure (lower than 10 kPa-a) is required. Generation of a low vacuum pressure is costly and requires high capital expenditure.

In contrast to conventional conditions, in various aspects, it has been discovered that desorption of $CO_2$ from some types of sorbents can be performed using low value steam at pressures of less than 100 kPa-a. The low value steam can correspond to steam at a temperature of 30° C. to 81° C. (or 30° C. to 70° C., or 55° C. to 81° C.) and at a pressure of 4 kPa-a to 50 kPa-a (or 4 kPa-a to 40 kPa-a, or 20 kPa-a to 50 kPa-a). The stream containing the steam can include 90 vol % or more of $H_2O$ (or 95 vol % or more, or 99 vol % or more, such as up to being substantially composed of only steam). This can simplify forming a high purity $CO_2$ stream after desorption of the $CO_2$ from the sorbent. In aspects where compounds other than steam are present in the low pressure steam stream, the total pressure of the steam stream can be 4 kPa-a to 60 kPa-a, or 4 kPa-a to 55 kPa-a, or 4 kPa-a to 50 kPa-a.

Due to the low pressure of the steam stream, the total heat capacity of the stream is relatively low. This means that the steam stream will have limited ability to modify the existing temperature in a sorbent bed. Thus, the steam can have a reduced or minimized impact on the temperature of the sorbent bed. As a result, the temperature of the steam stream may not necessarily correspond to the average temperature of the bed during the desorption step. In some aspects, the average bed temperature of the sorption bed during the corresponding sorption step can be similar to the temperature of the steam used for desorption. In such aspects, the corresponding sorption step for adsorbing the $CO_2$ can be operated at an average bed temperature of 0° C. to 150° C., or 40° C. to 100° C., or 50° C. to 80° C., or 50° C. to 70° C. In other aspects, the corresponding sorption step can be operated at a higher average bed temperature than the temperature of the steam stream. In such aspects, the corresponding sorption step can be operated at an average bed temperature of 50° C. to 150° C., or 100° C. to 150° C. In such aspects, even though the steam used during the desorption step is at a lower temperature than the temperature from the sorption step, because of the relatively low thermal mass of the steam stream the sorption bed remains at a temperature near the temperature of the sorption step. When using low-pressure steam, the driving force for desorbing $CO_2$ is believed to correspond to a low partial pressure of $CO_2$ which is established by flowing high purity steam over the bed at desorption temperature. It is noted that a sorption bed temperature that is substantially lower than the temperature of the steam stream is not preferred, as this can potentially result in condensation of $H_2O$ within the sorbent bed.

In some aspects, the corresponding sorption step can be performed at a pressure that is near ambient pressure. For example, the pressure during the corresponding sorption step can be 95 kPa-a to 150 kPa-a, or 95 kPa-a to 130 kPa-a. In some aspects, the difference in total pressure between the sorption step and the desorption step can be 120 kPa or less, or 100 kPa or less, such as down to 50 kPa or possibly still lower. During desorption using low value steam, the molar amount of steam passed through the bed can correspond to 1.0 to 20.0 times the maximum sorption capacity for the bed at the temperature of the bed. Additionally or alternately, the molar amount of steam can correspond to 1.0 to 20.0 times the amount of $CO_2$ that was sorbed during a prior sorption step. As noted above, due to the relatively low heat capacity and thermal mass of the steam stream relative to the heat capacity and the thermal mass of the sorption bed, the temperature of the bed may correspond to the temperature of the corresponding sorption step, and therefore may be different from the temperature of the steam used during the desorption step. The maximum sorption capacity of a bed at a temperature and a desired $CO_2$ partial pressure is defined herein based on the following procedure. First, the bed is purged for 5.0 minutes using steam or non-absorbing gas such as $N_2$ at above the ambient pressure, preferably at 200 kPa-a and the specified temperature. The bed is then exposed to a $CO_2/N_2$ gas mixture flow containing the desired $CO_2$ partial pressure at total pressure of 1 atm. The flow is continued until less than 90 vol % of the $CO_2$ is sorbed, which corresponds to breakthrough due to saturation of the sorbent. The molar amount of $CO_2$ sorbed by the adsorbent at breakthrough can then be calculated. This is defined as the maximum sorption capacity at the desired temperature and $CO_2$ partial pressure.

One benefit of using low-pressure steam as the sweep gas for desorption of $CO_2$ is that the amount of waste heat generated during the desorption process can be reduced or minimized. The low pressure of the steam (less than 100 kPa-a) can greatly reduce the amount of energy that is required to generate the stream. Additionally, in some aspects, the low pressure steam stream can be generated as a by-product from a heat recovery process for another system. For example, one application for using a $CO_2$ sorption/desorption cycle is for capturing $CO_2$ from the exhaust of a gas-fired turbine in a power plant. In such a power plant, the excess heat from the gas turbine is usually used to raise steam, which can then be used to drive one or more steam turbines for additional electrical power generation. Depending on the configuration of the heat recovery system, the state of the steam after the final turbine can correspond to steam with a pressure below 100 kPa-a and a temperature of 30° C. to 80° C. This steam after the final turbine corresponds to steam where the substantial majority of the energy content has already been recovered. Thus, any energy lost by using such a steam stream to facilitate $CO_2$ desorption represents a reduced or minimized loss of waste heat to the environment. Alternatively, low pressure steam can be generated from an exhaust of a standalone gas-fired steam turbine. This approach provides the required steam while generating an additional electricity.

The low pressure of the steam stream can also provide another unexpected benefit. Traditionally, the low pressure of the steam stream would be viewed as a disadvantage. For example, in order to get such a low pressure stream to flow through the bed, an additional pump is needed on the exit side of the bed to provide a driving force for drawing the low pressure stream through the bed. However, when a low pressure steam stream is used as a sweep stream during desorption of $CO_2$, it has been discovered that this disadvantage can be minimized or even eliminated by using a liquid ring pump as the pump to draw the low pressure stream through the bed. Due to the nature of operation of the liquid ring pump, a substantial amount of the water vapor present in the sweep stream is removed as the stream passes through the ring pump. As a result, the ring pump outputs a stream with a pressure of roughly 100 kPa-a that has a $CO_2$ content of 90 vol % or more, or 95 vol % or more. Thus, by using a steam stream with a pressure less than 100 kPa-a as the sweep gas for $CO_2$ desorption, the pump used for drawing the sweep stream through the bed can also perform a separation to generate a high purity $CO_2$ stream. This can substantially reduce the cost of recovering a high purity $CO_2$ stream from the desorption effluent stream.

Definitions

In this discussion, sorption is defined as including both adsorption and absorption. Adsorption refers to physical association of a compound with a surface or active site, such as physisorption of $CO_2$ on a solid surface. Absorption corresponds to a physical or chemical incorporation of compound into a different phase, such as incorporation of gas phase $CO_2$ into a complex with a liquid phase amine. Desorption is defined as separation of an adsorbed or absorbed compound from the adsorption surface or absorption phase.

In this discussion, a sorbent is defined as solid or liquid that can be used as an adsorbent or an absorbent. A sorbent bed corresponds to a structure that a fluid flow can be passed over and/or through that includes an adsorbent or absorbent.

In this discussion, the average temperature of a sorption bed is defined as the average of the temperature of the bed at the flow inlet and the flow outlet. It is noted that separate flow inlets and/or outlets may be used at different times during a sorption/desorption cycle. The average bed temperature can be measured based on the average of the temperature of the flow inlet(s) and the flow outlet(s) that are in use during a given step. Depending on the aspect, the average bed temperature can be from 0° C. to 150° C.

The terms "coating" or "covering" as used herein, unless the context indicates otherwise, describes covering of the solids by an infused or encapsulating liquid. The solid surface is impregnated with liquid (infused or encapsulating liquid) by appropriate solid surface functionalization that includes chemical functionalization and in some cases textured/physical functionalization. In some instances, roughness of the surface acts as the intrinsic surface texture. The impregnating liquid is covering the solid surface and keeps its liquid nature. It is this liquid nature that can provide medium for separation and extraction. The liquid is able to infuse into the surface of the solids or encapsulate the entire solid surface because its chemistry allows the liquid to substantially spread onto the solid fully. The spreading is measured using the liquid contact angle on the solid.

In some aspects, the Performance Index (PI) of the porous liquid is greater than 150.0 $m^{-1}$, or greater than 500.0 $m^{-1}$, such as up to 3000 $m^{-1}$ or possibly still higher. PI is defined as PI=(Vl/V)(Al/V), where Vl and Al is the volume and surface area of the impregnating liquid, respectively. V is the system volume which is defined as the volume that holds the solid structure and all of the void space within it. In many cases where the impregnating liquid spreading over the surface without generating liquid bridge, Al is the same as the projected surface area of the solid substrate. Porous liquid with PI greater than 150 $m^{-1}$ provides smaller system volume, and thus lower capital cost.

Configuration Example

Figure 1:
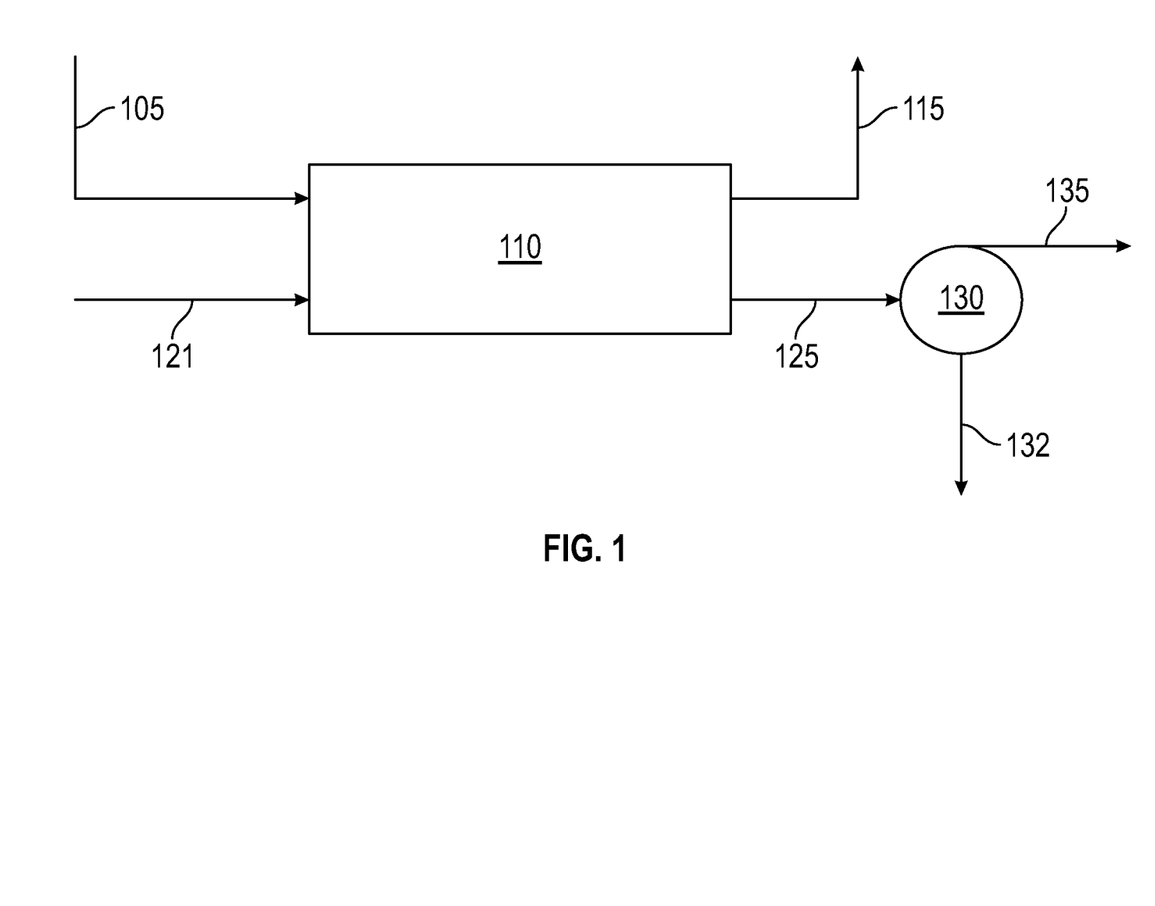
FIG. 1 shows an example of a configuration for separating $CO_2$ from a gas stream using a sorbent bed and a pump with associated ring cooler.

FIG. 1 shows an example of a sorbent bed system that is configured to allow for desorption of $CO_2$ using low value steam as part of a cyclic sorption/desorption process. In FIG. 1, sorbent bed 110 corresponds to a bed that includes an adsorbent and/or absorbent for $CO_2$. During a sorption step, a $CO_2$-containing stream 105 is introduced into sorbent bed 110 for removal of $CO_2$ from the stream. This results in formation of a $CO_2$-depleted stream 115. The $CO_2$-containing stream 105 can correspond to an exhaust flow from a gas turbine, a flue gas from a furnace, or any other convenient stream that contains between 0.01 vol % and 25 vol % $CO_2$ relative to the volume of the $CO_2$-containing stream 105, or 0.01 vol % to 20 vol %, or 0.01 vol % to 10 vol %, or 0.5 vol % to 25 vol %, or 0.5 vol % to 20 vol %, or 0.5 vol % to 10 vol %, or 2.0 vol % to 25 vol %, or 2.0 vol % to 20 vol %, or 2.0 vol % to 10 vol %. During the sorption step of operation of the sorption bed 110, the sorption bed 110 can remove 90 vol % or more of the $CO_2$ present in the $CO_2$-containing stream 105, or 95 vol % or more, or 98 vol % or more, such as up to removing substantially all of the $CO_2$ present in the $CO_2$-containing stream. This level of sorption results in a $CO_2$-depleted stream that contains 3.0 vol % or less of $CO_2$ relative to the volume of the $CO_2$-depleted stream, or 2.0 vol % or less, or 1.0 vol % or less, such as down to containing substantially no $CO_2$ (i.e., 0.01 vol % or less).

After the adsorption step is finished, the flow of the $CO_2$-containing stream can be stopped. The desorption step can then be started, optionally after an intermediate purge step. During a desorption step, a low-pressure steam stream 121 can be passed through sorbent bed 110. The low pressure steam stream 121 can be generated in any convenient manner. For example, stream 121 can correspond to a steam stream from a boiler, a steam stream passed out of a heat recovery system, a steam stream used to drive a steam turbine, or another convenient type of low-pressure steam stream. The low-pressure steam stream 121 is shown in FIG. 1 as flowing in the same direction (co-current) as the direction of flow for $CO_2$-containing stream 105. In other aspects, low-pressure steam stream 121 can be passed into sorbent bed 110 in any convenient manner, such as flowing counter-current to the direction of flow of $CO_2$-containing stream 105. The low-pressure steam stream can facilitate desorption of $CO_2$ previously absorbed or adsorbed in the sorbent bed to form an exhaust stream 125 that contains $CO_2$ and $H_2O$. The low-pressure steam stream 121 can be introduced into sorbent bed 110 at a pressure of 4 kPa-a to 50 kPa-a. In order to cause this low-pressure steam stream 121 to flow through sorbent bed 110, a liquid ring pump 130 can be used on the far side of sorbent bed 110 to create a pressure below the pressure of the low-pressure steam stream. For example, if the low-pressure steam stream is at a pressure of 30 kPa-a, the ring pump can be used to reduce the pressure on the exit side of sorbent 110 to 20 kPa-a. Exhaust stream 125 passes through liquid ring pump 130, which results in separation of exhaust stream 125 to form water 132 and a high purity $CO_2$ stream 135. The high purity $CO_2$ stream 135 can include 90 vol % or more $CO_2$ relative to a volume of high purity $CO_2$ stream 135, or 95 vol % or more, such as up to substantially containing only $CO_2$.

Integration of Sorbent Bed with Power Plant

Figure 2:
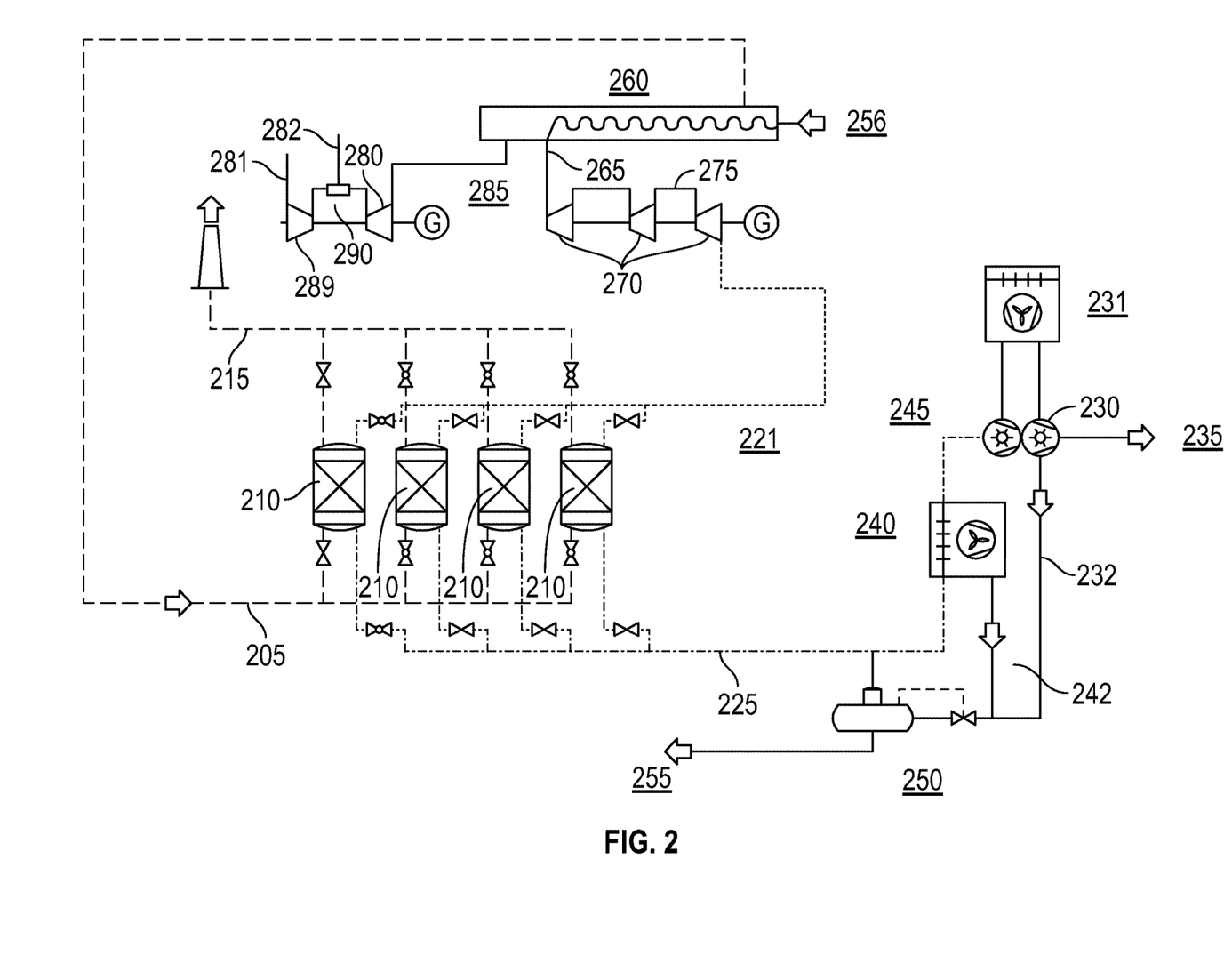
FIG. 2 shows an example of a configuration for integrating sorbent beds for $CO_2$ capture with a combined cycle power plant.

FIG. 2 shows an example of integration of a plurality of sorbent beds with combustion source so that $CO_2$ generated by the combustion source can be continuously separated using the sorbent beds. In the configuration shown in FIG. 2, the combustion source corresponds to the combustion chamber of a gas-powered turbine in a combined cycle power plant. In other aspects, any convenient combustion source could be used to provide a $CO_2$-containing stream, such as a boiler, a furnace, and/or a turbine driven using another type of hydrocarbon fuel (including coal).

In the configuration shown in FIG. 2, the steam stream 221 used for desorption of $CO_2$ corresponds to at least a portion of the steam generated by heat exchange from the exhaust of a combined cycle gas-powered turbine. Such steam can be used to power one or more steam turbines in order to convert the steam into a low-pressure steam stream. In other aspects, any convenient source of steam can be used, so long as the steam is at a desirable pressure (e.g., 4 kPa-a to 50 kPa-a) and temperature (e.g., 30° C. to 81° C.) for use as a steam stream for desorption of $CO_2$.

FIG. 2 shows a process flow where 4 sorption beds 210 are used for $CO_2$ capture. Using a plurality of sorption beds can allow for continuous operation by having at least one bed available for $CO_2$ removal from a gas stream while one or more other beds are in other stages of the sorption/desorption cycle. The sorption beds can be adsorption beds or absorption beds, such as absorption beds using porous liquid amine. In the example shown in FIG. 2, the current status of the sorbent beds 210 is that one sorbent bed is operating under an adsorption/absorption condition while the other three beds are in the desorption mode.

In the example shown in FIG. 2, air 281 is fed into a compressor 289 to form a compressed air stream. The compressed air is fed into combustor or combustion zone 290 along with fuel 282 (such as natural gas) in order to power turbine 280. This also results in production of a flue gas stream 285. The flue gas stream is passed through a heat recovery steam generator 260 to allow for formation of high pressure, high temperature steam stream 265 and a cooled flue gas 205.

The flue gas 205 corresponds a $CO_2$-containing stream that can be passed into sorption bed(s) 210. In FIG. 2, one sorption bed is shown as operating in sorption step of a sorption/desorption cycle. This bed generates a $CO_2$-lean gas stream 215 that can be optionally further processed prior to being used in a convenient manner, such as being exhausted to the atmosphere. Optionally, a heat exchanger can be used to transfer heat from $CO_2$-lean gas stream 215 to steam stream 221, if it is desired to raise the temperature of steam stream 221.

Heat recovery steam generator 260 transfers heat from flue gas stream 285 to water-containing stream 256 in order to form high pressure, high temperature steam stream 265. The high pressure, high temperature steam stream 265 can then be used to power one or more steam turbines 270. In the example shown in FIG. 2, three steam turbines are shown, but any convenient number of turbines can be used. In addition to generating electricity, the one or more steam turbines 270 can convert high pressure, high temperature steam stream 265 into a low pressure steam stream 221. Low pressure steam stream 221 can have a pressure of 4 kPa-a to 50 kPa-a and a temperature of 30° C. to 81° C.

It is noted in conventional approach the steam from the exhaust of the medium pressure turbine, such as steam 275, is used for bed desorption. However, the pressure of this steam stream is substantially higher than the atmospheric pressure and it possesses a significant amount of energy. This steam stream is the input to the low pressure steam turbine for further generation of electricity. Therefore, using this energetic steam for desorption of the bed significantly reduces the output electricity of the power plant, making the conventional approach costly. By contrast, in various aspects low pressure steam stream 221 can be used as the steam stream for desorption. This allows for additional electrical power generation by recovery of energy from steam 275.

In FIG. 2, three of the sorption beds from sorption beds 210 are shown as being in the desorption step of a sorption/desorption cycle. During desorption, low pressure steam stream 221 is passed through sorption bed(s) 210 to desorb $CO_2$ that was added to the sorption bed(s) 210 during a prior sorption step. This results in formation of exhaust stream 225 that contains water and $CO_2$. Water can then be removed from exhaust stream 225 in order to form a high purity $CO_2$ stream 235 with a $CO_2$ concentration of 90 vol % or more. In FIG. 2, this is accomplished by first passing exhaust stream 225 through a fin fan 240. This cools exhaust stream 225, resulting in formation of cooled exhaust stream 245 and condensation of some water to form water stream 242. The cooled exhaust stream 245 is then passed through liquid ring pump 230, which is cooled by ring cooler 231. This results in formation of high purity $CO_2$ stream 235 at a pressure of roughly 100 kPa-a while removing additional water stream 232. Water stream 232 and water stream 242 can then be passed through optional deaerator 250 to form deaerated water stream 255. The deaerated water stream 255 can then be recycled (optionally after additional processing) for use as input water 256 for the heat recovery steam generator 260.

It is noted that FIG. 2 shows an example of a combustion source where steam is generated as part of the operation of the combustion source. In other aspects, a combustion source may not have an associated source of low pressure steam, or it may not be desirable to use an existing source of steam. In such aspects, a separate boiler (not shown) can be used to provide low pressure steam to facilitate processing of a $CO_2$-containing flue gas using a sorption/desorption cycle as described herein.

In a configuration such as FIG. 2, the various elements can be referred to as being in fluid communication with one another. Fluid communication can correspond to direct fluid communication or indirect fluid communication. As an example, in FIG. 2, heat recovery steam generator 260 is in direct fluid communication with steam turbines 270 via the conduit that carries high temperature steam stream 265. The heat recovery steam generator 260 is in indirect fluid communication with sorbent beds 210 via steam turbines 270. It is noted that the valves shown in FIG. 2 can allow some fluid communication to be intermittent, such as the fluid communication with the sorbent beds. At a given point in time, a sorbent bed 210 will typically be in fluid communication with either steam turbines 270 or combustion zone 290, but not both. (It is also possible for a sorbent bed to be in an intermediate state without fluid communication to the steam turbines 270 or combustion zone 290.)

Example of Sorbent Bed—Liquid Amine Supported on High Surface Area Support

Low value steam can be used during the desorption step of a sorption/desorption cycle with any convenient type of sorbent that a) can provide a desirable level of sorption of $CO_2$ at a temperature similar to or greater than the temperature of the low value steam stream, and b) that can desorb $CO_2$ at a temperature similar to the sorption temperature when exposed to steam at a pressure of 50 kPa-a or less.

In some aspects, an example of a suitable sorbent for use with a desorption step based on low pressure steam can be a sorbent based on a film of liquid amine coated on, covering, and/or otherwise supported on a high surface area support. U.S. Patent Application Publication 2020/0147545 describes an example of such an absorbent, which is described as a "porous liquid". U.S. Patent Application Publication 2020/0147545 is incorporated herein by reference for the limited purpose of describing sorbents that are suitable for $CO_2$ absorption.

For example, as described in U.S. Patent Application Publication 2020/0147545, a liquid film of a suitable liquid amine can be used to encapsulate or infuse into, wet, and stably cover the surface of a high surface area solid, with the Performance Index (PI) of the porous liquid being greater than 150 $m^{-1}$, or greater than 500 $m^{-1}$, such as up to 3000 $m^{-1}$ or possibly still higher. In some aspects, the high surface area solid can correspond to a rough, porous, roughened, and/or textured surface. The liquid film can encapsulate or infuse into, wet, and stably cover the high surface area solid if the solid has sufficient surface roughness, large surface area, and physical and/or chemical affinity (e.g., the high surface area solid may be activated prior to the application of the liquid film) for the liquid film. The degree of roughness and/or texture required to stably cover the high surface area solid will depend on the formulation of the liquid film and the chemical make of the surface of the high surface area solid. Examples of suitable surfaces includes wools and/or fibers (such as quartz wool/fiber, polyethylene wool/fiber, etc.) that have a roughness and physical structure that is sufficient for use as a high surface area solid. Other examples can include 3D printed structures that have a roughness that is sufficient to hold liquid. The roughness surface of the high surface area solid (whether it is rough, porous, or textured by nature and/or subsequently roughened and/or textured), R, defined as the ratio between the actual and projected/protruded and/or indented/depressed areas of the surface, may be any value greater than 1 (as 1 represents a flat surface). For example, the roughness of the surface is at least 1.01, at least 1.1, at least 1.2, at least 1.3, at least 1.4, at least 1.5, at least 1.6, at least 1.7, at least 1.8, at least 1.9, at least 2, at least 2.25, at least 2.5, at least 2.75, at least 3, at least 3.5, at least 4, at least 4.5, at least 5, or more such as up to 20.

In certain aspects, the high surface area solid includes at least one of a rough surface, a textured surface, or both. Thus, a high surface area solid may be prepared with a surface that has a matrix of solid features or a rough surface. The matrix of solid features may include microstructures and/or nanostructures that protrude or extend from the surface of the high surface area solid. The texture (e.g., the micro-structures and/or nano-structures) may be applied to the surface of the high surface area solid.

When a matrix of solid features is present, the solid features (e.g., micro-structures and/or nano-structures) may have an average characteristic dimension (i.e., length for roughly rod-shaped objects, thickness, depth, height, or combinations thereof) of 0.1 µm to 1000 µm (e.g., 1 µm to 200 µm or 10 µm to 50 µm). For example, the average characteristic dimension of the solid features may be 0.1 µm to 1000 µm, 0.1 µm to 900 µm, 0.1 µm to 800 µm, 0.1 µm to 700 µm, 0.1 µm to 600 µm, 0.1 µm to 500 µm, 0.1 µm to 400 µm, 0.1 µm to 300 µm, 0.1 µm to 200 µm, 0.1 µm to 100 µm, 0.1 µm to 50 µm, 25 µm to 1000 µm, 25 µm to 900 µm, 25 µm to 800 µm, 25 µm to 700 µm, 25 µm to 600 µm, 25 µm to 500 µm, 25 µm to 400 µm, 25 µm to 300 µm, 25 µm to 200 µm, 25 µm to 100 µm, 75 µm to 1000 µm, 75 µm to 900 µm, 75 µm to 800 µm, 75 µm to 700 µm, 75 µm to 600 µm, 75 µm to 500 µm, 75 µm to 400 µm, 75 µm to 300 µm, 75 µm to 200 µm, 150 µm to 1000 µm, 150 µm to 900 µm, 150 µm to 800 µm, 150 µm to 700 µm, 150 µm to 600 µm, 150 µm to 500 µm, 150 µm to 400 µm, 150 µm to 300 µm, 300 µm to 1000 µm, 300 µm to 900 µm, 300 µm to 800 µm, 300 µm to 700 µm, 300 µm to 600 µm, 300 µm to 500 µm, 300 µm to 400 µm, 400 µm to 1000 µm, 400 µm to 900 µm, 400 µm to 800 µm, 400 µm to 700 µm, 400 µm to 600 µm, 400 µm to 500 µm, 500 µm to 1000 µm, 500 µm to 900 µm, 500 µm to 800 µm, 500 µm to 700 µm, 500 µm to 600 µm, 600 µm to 1000 µm, 600 µm to 900 µm, 600 µm to 800 µm, 600 µm to 700 µm, 700 µm to 1000 µm, 700 µm to 900 µm, 700 µm to 800 µm, 800 µm to 1000 µm, 800 µm to 900 µm, or 900 µm to 1000 µm. In various aspects, the solid features (e.g., microstructures and/or nano-structures) are arranged with average spacing of 0.1 µm to 500 µm (e.g., 5 µm to 200 µm or 10 µm to 30 µm) between adjacent solid features. For example, the average space between solid features may be 0.1 µm to 500 µm, 0.1 µm to 500 µm, 0.1 µm to 450 µm, 0.1 µm to 400 µm, 0.1 µm to 350 µm, 0.1 µm to 300 µm, 0.1 µm to 250 µm, 0.1 µm to 200 µm, 0.1 µm to 150 µm, 0.1 µm to 100 µm, 0.1 µm to 50 µm, 0.1 µm to 30 µm, 1 µm to 500 µm, 1 µm to 450 µm, 1 µm to 400 µm, 1 µm to 350 µm, 1 µm to 300 µm, 1 µm to 250 µm, 1 µm to 200 µm, 1 µm to 150 µm, 1 µm to 100 µm, 1 µm to 50 µm, 1 µm to 30 µm, 5 µm to 500 µm, 5 µm to 450 µm, 5 µm to 400 µm, 5 µm to 350 µm, 5 µm to 300 µm, 5 µm to 250 µm, 5 µm to 200 µm, 5 µm to 150 µm, 5 µm to 100 µm, 5 µm to 50 µm, 5 µm to 30 µm, 10 µm to 500 µm, 10 µm to 450 µm, 10 µm to 400 µm, 10 µm to 350 µm, 10 µm to 300 µm, 10 µm to 250 µm, 10 µm to 200 µm, 10 µm to 150 µm, 10 µm to 100 µm, 10 µm to 50 µm, 25 µm to 500 µm, 25 µm to 450 µm, 25 µm to 400 µm, 25 µm to 350 µm, 25 µm to 300 µm, 25 µm to 250 µm, 25 µm to 200 µm, 25 µm to 150 µm, 25 µm to 100 µm, 50 µm to 500 µm, 50 µm to 450 µm, 50 µm to 400 µm, 50 µm to 350 µm, 50 µm to 300 µm, 50 µm to 250 µm, 50 µm to 200 µm, 50 µm to 150 µm, 50 µm to 100 µm, 100 µm to 500 µm, 100 µm to 450 µm, 100 µm to 400 µm, 100 µm to 350 µm, 100 µm to 300 µm, 100 µm to 250 µm, 100 µm to 200 µm, 100 µm to 150 µm, 150 µm to 500 µm, 150 µm to 450 µm, 150 µm to 400 µm, 150 µm to 350 µm, 150 µm to 300 µm, 150 µm to 250 µm, 150 µm to 200 µm, 200 µm to 500 µm, 200 µm to 450 µm, 200 µm to 400 µm, 200 µm to 350 µm, 200 µm to 300 µm, 200 µm to 250 µm, 250 µm to 500 µm, 250 µm to 450 µm, 250 µm to 400 µm, 250 µm to 350 µm, 250 µm to 300 µm, 300 µm to 500 µm, 300 µm to 450 µm, 300 µm to 400 µm, 300 µm to 350 µm, 350 µm to 500 µm, 350 µm to 450 µm, 350 µm to 400 µm, 400 µm to 500 µm, or 450 µm to 500 µm.

In some aspects, the solid features are rough. For example, the solid features of the high surface area solid can have an average surface roughness R of 1.1 to 10.

The texture or roughness may be imparted through extrusion, electrospinning, blow-molding of a mixture of materials (e.g., glass, polyethylene, a continuous polymer blend, or mixture of a polymer and particles), or additive manufacturing such as 3D printing laser metal deposition. One of the materials may be subsequently dissolved, etched, melted, or evaporated away, leaving a textured, and/or rough surface behind. The texture or roughness may be imparted by mechanical roughening (e.g., tumbling with an abrasive), spray-coating or polymer spinning, deposition of particles from solution (e.g., layer-by-layer deposition, evaporating away liquid from a suspension of liquid and particles), and/or additive manufacturing such as 3D printing laser metal deposition. Other possible methods for imparting the texture or roughness include: deposition of a polymer from a solution (e.g., the polymer forms a rough, porous, or textured surface behind); extrusion or blow-molding of a material that expands upon cooling, leaving a wrinkled surface (e.g., wool, including glass wool, polyethylene wool, quartz wool, and other fibers); and application of a layer of a material onto a surface that is under tension or compression, and subsequently relaxing the tension or compression of surface beneath, resulting in a textured surface.

Optionally, the surface of the high surface area solid may be roughened.

In various aspects, the surface area of the high surface area solid is defined as the apparent surface area, which is defined as the total geometric area if there were no texture or roughness on the surface. In some aspects, the surface area of the high surface area solid can be greater than 0.001 $m^2/g$, greater than 0.01 $m^2/g$, greater than 0.1 $m^2/g$, or greater than 0.2 $m^2/g$, such as up to 45 $m^2/g$ or possibly still higher For example, the high surface area solid has a surface area of 0.001 $m^2/g$ to 45 $m^2/g$, 0.001 $m^2/g$ to 40 $m^2/g$, 0.001 $m^2/g$ to 35 $m^2/g$, 0.001 $m^2/g$ to 30 $m^2/g$, 0.001 $m^2/g$ to 25 $m^2/g$, 0.001 $m^2/g$ to 20 $m^2/g$, 0.001 $m^2/g$ to 15 $m^2/g$, 0.001 $m^2/g$ to 10 $m^2/g$, 0.001 $m^2/g$ to 5 $m^2/g$, 0.001 $m^2/g$ to 1.0 $m^2/g$, 0.01 $m^2/g$ to 45 $m^2/g$, 0.01 $m^2/g$ to 40 $m^2/g$, 0.01 $m^2/g$ to 35 $m^2/g$, 0.01 $m^2/g$ to 30 $m^2/g$, 0.01 $m^2/g$ to 25 $m^2/g$, 0.01 $m^2/g$ to 20 $m^2/g$, 0.01 $m^2/g$ to 15 $m^2/g$, 0.01 $m^2/g$ to 10 $m^2/g$, 0.01 $m^2/g$ to 5 $m^2/g$, 0.01 $m^2/g$ to 1.0 $m^2/g$, 0.1 $m^2/g$ to 45 $m^2/g$, 0.1 $m^2/g$ to 40 $m^2/g$, 0.1 $m^2/g$ to 35 $m^2/g$, 0.1 $m^2/g$ to 30 $m^2/g$, 0.1 $m^2/g$ to 25 $m^2/g$, 0.1 $m^2/g$ to 20 $m^2/g$, 0.1 $m^2/g$ to 15 $m^2/g$, 0.1 $m^2/g$ to 10 $m^2/g$, 0.2 $m^2/g$ to 45 $m^2/g$, 0.2 $m^2/g$ to 40 $m^2/g$, 0.2 $m^2/g$ to 35 $m^2/g$, 0.2 $m^2/g$ to 30 $m^2/g$, 0.2 $m^2/g$ to 25 $m^2/g$, 0.2 $m^2/g$ to 20 $m^2/g$, 0.2 $m^2/g$ to 15 $m^2/g$, 0.2 $m^2/g$ to 10 $m^2/g$, 0.5 $m^2/g$ to 45 $m^2/g$, 0.5 $m^2/g$ to 40 $m^2/g$, 0.5 $m^2/g$ to 35 $m^2/g$, 0.5 $m^2/g$ to 30 $m^2/g$, 0.5 $m^2/g$ to 25 $m^2/g$, 0.5 $m^2/g$ to 20 $m^2/g$, 0.5 $m^2/g$ to 15 $m^2/g$, 0.5 $m^2/g$ to 10 $m^2/g$, 5 $m^2/g$ to 45 $m^2/g$, 5 $m^2/g$ to 40 $m^2/g$, 5 $m^2/g$ to 35 $m^2/g$, 5 $m^2/g$ to 30 $m^2/g$, 5 $m^2/g$ to 25 $m^2/g$, 5 $m^2/g$ to 20 $m^2/g$, 5 $m^2/g$ to 15 $m^2/g$, 10 $m^2/g$ to 45 $m^2/g$, 10 $m^2/g$ to 40 $m^2/g$, 10 $m^2/g$ to 35 $m^2/g$, 10 $m^2/g$ to 30 $m^2/g$, 10 $m^2/g$ to 25 $m^2/g$, 10 $m^2/g$ to 20 $m^2/g$, 15 $m^2/g$ to 45 $m^2/g$, 15 $m^2/g$ to 40 $m^2/g$, 15 $m^2/g$ to 35 $m^2/g$, 15 $m^2/g$ to 30 $m^2/g$, 15 $m^2/g$ to 25 $m^2/g$, 20 $m^2/g$ to 45 $m^2/g$, 20 $m^2/g$ to 40 $m^2/g$, 20 $m^2/g$ to 35 $m^2/g$, 20 $m^2/g$ to 30 $m^2/g$, 25 $m^2/g$ to 45 $m^2/g$, 25 $m^2/g$ to 40 $m^2/g$, 25 $m^2/g$ to 35 $m^2/g$, 30 $m^2/g$ to 45 $m^2/g$, 30 $m^2/g$ to 40 $m^2/g$, or 35 $m^2/g$ to 40 $m^2/g$.

In order to be effective for sorption/desorption of $CO_2$, the liquid film can include at least one of an amine, monoethanolamine, tetraethylenepentamine, an alkali metal hydroxide (e.g., potassium hydroxide, sodium hydroxide, lithium hydroxide, rubidium hydroxide, cesium hydroxide, or combinations thereof), potassium hydroxide, sodium hydroxide, lithium hydroxide, or combinations thereof; a porous liquid with one of the aforementioned compounds may be used to extract carbon dioxide from a gaseous mixture (such as flue gas, or a chemical or refinery gas).

In various aspects, the liquid film has a thickness from the bottom of the roughness or the texture to the top surface of the liquid film no greater than 1400 µm (e.g. a thickness no greater than 1000 µm, 10 µm to 1000 µm, or 10 µm to 100 µm). For example, in any aspect or embodiment described herein, the thickness of the liquid film on substantially covering the high surface area solid is ≤1400 µm, ≤1300 µm, ≤1200 µm, ≤1100 µm, ≤1000 µm, ≤900 µm, ≤800 µm, ≤700 µm, ≤600 µm, ≤500 µm, ≤400 µm, ≤300 µm, ≤200 µm, ≤100 µm, 10 µm to 1400 µm, 10 µm to 1200 µm, 10 µm to 1000 µm, 10 µm to 800 µm, 10 µm to 900 µm, 10 µm to 700 µm, 10 µm to 600 µm, 10 µm to 500 µm, 10 µm to 400 µm, 10 µm to 300 µm, 10 µm to 200 µm, 10 µm to 100 µm, 100 µm to 1400 µm, 100 µm to 1200 µm, 100 µm to 1000 µm, 100 µm to 800 µm, 100 µm to 900 µm, 100 µm to 700 µm, 100 µm to 600 µm, 100 µm to 500 µm, 100 µm to 400 µm, 100 µm to 300 µm, 100 µm to 200 µm, 250 µm to 1400 µm, 250 µm to 1200 µm, 250 µm to 1000 µm, 250 µm to 800 µm, 250 µm to 900 µm, 250 µm to 700 µm, 250 µm to 600 µm, 250 µm to 500 µm, 500 µm to 1400 µm, 500 µm to 1200 µm, 500 µm to 1000 µm, 500 µm to 800 µm, 500 µm to 900 µm, 500 µm to 700 µm, 750 µm to 1400 µm, 750 µm to 1200 µm, 750 µm to 1000 µm, 100 µm to 1400 µm, 1000 µm to 1200 µm, or 1200 µm to 1400 µm.

Example—Energy Comparison of Sorption/Desorption of $CO_2$ Versus Conventional Amine Tower Modeling calculations were used to determine the energy consumption for performing $CO_2$ removal from the flue gas of a gas turbine from a combined cycle power plant having a configuration similar to FIG. 2. In the model calculations, the total power output of the turbines from the natural gas combined cycle power plant is 630 MW with a lower heating value LHV plant efficiency of 57%. Based on combustion of natural gas with LHV of 47,454 kJ/kg, generation of this amount of power via a combined cycle power plant results in generation of 212.9 tons/hr of $CO_2$. Based on a design basis of using a sweep gas corresponding to 5 moles of steam per mole of $CO_2$ that is captured by the sorbent beds, the steam generated by the combined cycle plant is more than enough to provide the low pressure steam stream for the $CO_2$ desorption step of the sorption/desorption cycle. The power penalty of taking steam from the exhaust of the low pressure turbine (LPT) at 300 mbara and 70° C. is 25 MW which is 4.0% of the net power plant output.

The energy penalty of 25 MW due to using exhaust of the low pressure steam turbine is 15 MW lower (about 38% lower) than the energy penalty proposed by an NETL case study (US Department of Energy, National Energy Technology Laboratory, "Cost and Performance Baseline for Fossil Energy Plants, Volume 1a: Bituminious Coal (PC) and Natural Gas to Electricity, Jul. 6, 2015, case 31A) where the steam is taken from the output of the medium pressure steam turbine/the input of the low pressure steam turbine. The NETL case study calculations are known to be more efficient than the current practiced/conventional approach. This demonstrates the unexpectedly large benefit that can be achieved by using low pressure steam for $CO_2$ desorption, in contrast to conventional methods.

The liquid ring cooler and associated liquid ring pump require and fin fan an additional 5.4 MW for operation to process the steam and $CO_2$ mixture that is exhausted from the sorbent beds. Addition of 15 MW energy is also required to compress $CO_2$ to a pressure suitable for transport. This corresponds to a total power requirement of 51 MW, or roughly 8% of the total power of the plant. This corresponds to roughly 1.59 GJ/ton of $CO_2$ that is removed from the flue gas. The pump and associated ring cooler generates a stream containing 95 vol % $CO_2$ at roughly 100 kPa-a. As a comparison, this is about 30% lower than the noted ideal NETL case study amine scrubber unit of the same size to handle the flue gas from the same combined cycle plant. The current approach consumes about two times lower energy than the conventional approach.

Example—Removing $CO_2$ from a Gas Stream Using Porous Liquid Amine on High Surface Area Support Two 3D printed structures were cleaned with solvent and then with plasma. A total of 619 mg (0.623 cc) of TEPA (triethylenepentamine) was introduced to the two 3D printed structures, generating PI=157.1 m$^{-1}$. The plasma treatment increased the surface energy of the 3D structures. The high surface energy and the roughness allowed the 3D structures to be fully wetted by the liquid amine and hold the liquid on its surfaces. The two porous liquid TEPAs were then mounted in an experimental tube where a 50:50 mixture of $CO_2$ and $N_2$ passed through the porous liquid TEPAs by sending the gas mixture into the entrance port of the tube. The temperature of the experimental tube was kept at 106° C. using a block heater during the gas flow. The outlet port of the tube was connected to a mass spectrometer (MS) for gas analysis.

Figure 3:
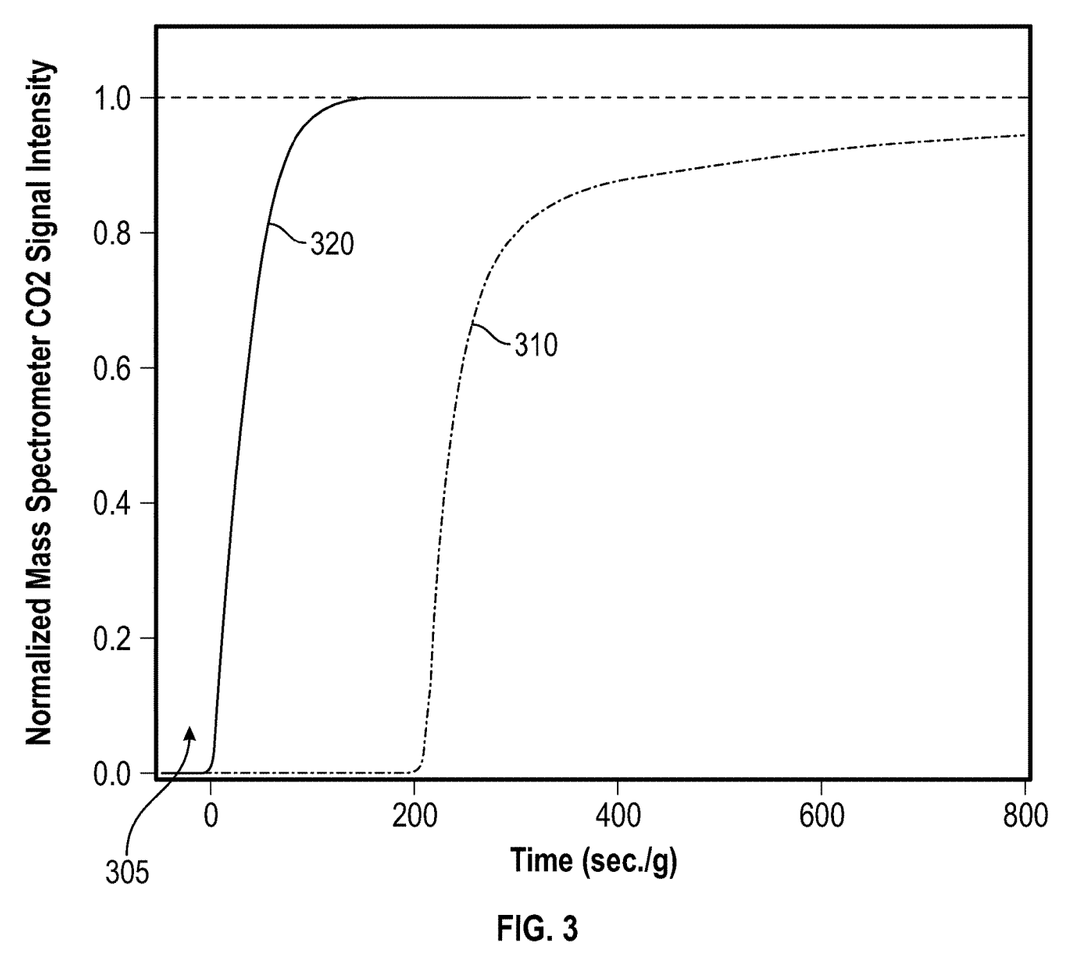
FIG. 3 weight-normalized breakthrough time of $CO_2$ during absorption at 106° C. with various sorbents.

FIG. 3 shows the variation of the normalized (divided by its maximum intensity) mass spectroscopy signal of $CO_2$ with time, also normalized to the weight of the amine. Time zero (location 305) is set when $N_2$ gas is detected at above the background level, preferably at 5% of its maximum intensity. The weight-normalized breakthrough time, tbw, is defined when $CO_2$ was detected at above the background level, preferably at 5% of its maximum intensity. Line 310 in FIG. 3 corresponds to the average of the $CO_2$ intensity for the porous liquid TEPAs as a function of time. In FIG. 3, line 310 shows that for a significant amount of time (tbw=210 seconds/g), no $CO_2$ was able to escape the porous liquid TEPAs. The tbw of 210 seconds/g is equivalent to the volume normalized breakthrough time, tbv=22 seconds/cc. The time axis in FIG. 3 represents the time per gram of amine when TEPA was used. The ability of amine to capture $CO_2$ at 106° C. is very surprising. Normally temperatures above 100° C. have been used to desorb $CO_2$ from amine. However, the ability of the porous liquid TEPA at 106° C. may be due to the liquid property of the infused amine in the porous liquid TEPA. At the elevated temperature, although the chemical reaction between $CO_2$ and amine is weak, the viscosity of the amine is also low. Low viscosity provides a greater diffusion length of $CO_2$ in the infused amine liquid and thus makes more amine available to react with $CO_2$ for removal. This behavior is solely due to the ability of the preserving liquid within the porosity of the surface in the porous liquid TEPA. FIG. 3 also shows the results of an experiment (line 320) when the said 3D printed structure were prepared as before but this time no amine was introduced to the structure (control). Results indicate that when no amine is infused within the roughness of the 3D printed structure the amount of $CO_2$ removed by the structure is undetectable.

Additional Embodiments

Embodiment 1. A method for desorption of $CO_2$ from a sorbent bed, comprising: exposing a steam stream comprising a steam pressure of 4 kPa to 50 kPa to a sorbent bed comprising sorbed $CO_2$ and a first average sorbent bed temperature of 0° C. to 150° C. to form an exhaust stream comprising steam and at least a portion of the sorbed $CO_2$, the steam stream comprising a temperature of 30° C. to 81° C. prior to entering the sorbent bed; and passing at least a portion of the exhaust stream through a liquid ring pump comprising an associated ring cooler to form a $CO_2$-containing stream comprising 90 vol % or more $CO_2$.

Embodiment 2. The method of Embodiment 1, wherein the steam stream comprises a total pressure of 4 kPa-a to 60 kPa-a, or wherein the steam stream comprises 95 vol % or more of steam, or a combination thereof.

Embodiment 3. The method of any of the above embodiments, wherein the $CO_2$-containing stream comprises a pressure of 90 kPa-a or more.

Embodiment 4. The method of any of the above embodiments, wherein the liquid ring pump is operated at a pressure that is lower than the pressure of the steam stream by 1.0 kPa or more.

Embodiment 5. The method of any of the above embodiments, wherein the average sorbent bed temperature during exposing the steam stream to the sorbent bed is 50° C. to 150° C.

Embodiment 6. The method of any of the above embodiments, further comprising exposing an input stream comprising 0.01 vol % to 25 vol % $CO_2$, relative to a volume of the input stream, to the sorbent bed at a second average sorbent bed temperature of 0° C. to 150° C. to adsorb $CO_2$, absorb $CO_2$, or a combination thereof, and to form a $CO_2$-depleted stream comprising 10 mol % or less of the $CO_2$ from the input stream.

Embodiment 7. The method of Embodiment 6, wherein exposing the input stream to the sorbent bed and exposing the steam stream to the sorbent bed comprise a cyclic process, and wherein exposing the steam stream to the sorbent bed comprises exposing the sorbent bed to a molar amount of steam comprising 1.0 times to 20.0 times a maximum $CO_2$ capacity of the sorbent bed; or wherein exposing the sorbent bed to the steam stream comprises exposing the sorbent bed to a molar amount of steam comprising 1.0 times to 20.0 times a molar amount of $CO_2$ that was absorbed by the sorbent bed, adsorbed by the sorbent bed, or a combination thereof, during the exposing the sorbent bed to the input stream; or a combination thereof.

Embodiment 8. The method of Embodiment 6 or 7, wherein the input stream comprises a combustion flue gas; or wherein the input stream comprises a flue gas from a combustion zone of a power plant, and wherein the steam stream comprises steam generated by heat exchange with at least a portion of the flue gas; or a combination thereof.

Embodiment 9. The method of any of the above embodiments, wherein the sorbent bed comprises an adsorbent, an absorbent, or a combination thereof.

Embodiment 10. The method of Embodiment 9, wherein the absorbent comprises an absorbent infused or encapsulated on a solid surface, covering a solid surface, or a combination thereof, the absorbent comprising a Performance Index of greater than 150 $m^{-1}$, the absorbent optionally comprising an amine, the solid surface optionally comprising a surface area of 0.001 $m^2/g$ to 45 $m^2/g$.

Embodiment 11. The method of claim 1, wherein the steam stream comprises steam generated by an exhaust of a standalone gas-fired steam turbine; or wherein the steam stream comprises steam generated by a boiler; or a combination thereof.

Embodiment 12. A system for sorption and desorption of $CO_2$ using a sorbent bed, comprising: a sorbent bed comprising an adsorbent, an absorbent, or a combination thereof, the sorbent bed comprising a first inlet, a steam inlet, a first outlet, and a desorption outlet; a combustion zone comprising a combustion outlet; a heat exchanger comprising a hot fluid inlet in fluid communication with the combustion outlet, a cooled fluid outlet, a water inlet, and a steam outlet, the first inlet of the sorbent bed being in fluid communication with the cooled fluid outlet, the steam inlet of the sorbent bed being in fluid communication with the steam outlet of the heat exchanger; and a liquid ring pump comprising an associated ring cooler in fluid communication with the desorption outlet.

Embodiment 13. The system of Embodiment 12, wherein the absorbent comprises an absorbent infused or encapsulated on a solid surface, covering a solid surface, or a combination thereof, the absorbent comprising a Performance Index of greater than 150 $m^{-1}$, the absorbent optionally comprising an amine, the solid surface optionally comprising a surface area of 0.001 $m^2/g$ to 45 $m^2/g$.

Embodiment 14. The system of Embodiment 12 or 13, wherein the steam inlet of the sorbent bed being in indirect fluid communication with the steam outlet of the heat exchanger via one or more steam turbines.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method for desorption of $CO_2$ from a sorbent bed, comprising:
    exposing a steam stream comprising a steam pressure of 4 kPa to 50 kPa as a sweep gas to a sorbent bed comprising sorbed $CO_2$ and a first average sorbent bed temperature of 0° C. to 150° C. to form an exhaust stream comprising steam and at least a portion of the sorbed $CO_2$, the steam stream comprising a temperature of 30° C. to 81° C. prior to entering the sorbent bed; and
    passing at least a portion of the exhaust stream through a liquid ring pump comprising an associated ring cooler to form a $CO_2$-containing stream comprising 90 vol % or more $CO_2$, and a liquid water stream,
    wherein the sorbent bed comprises an absorbent, the absorbent being infused or encapsulated on a solid surface, covering a solid surface, or a combination thereof, and wherein the absorbent infused or encapsulated on the solid surface, covering the solid surface, or a combination thereof, is in a liquid state.

2. The method of claim 1, wherein the steam stream comprises a total pressure of 4 kPa-a to 60 kPa-a, or wherein the steam stream comprises 95 vol % or more of steam, or a combination thereof.

3. The method of claim 1, wherein the $CO_2$-containing stream comprises a pressure of 90 kPa-a or more.

4. The method of claim 1, wherein the liquid ring pump is operated at a pressure that is lower than the pressure of the steam stream by 1.0 kPa or more.

5. The method of claim 1, wherein the average sorbent bed temperature during exposing the steam stream to the sorbent bed is 50° C. to 150° C.

6. The method of claim 1, further comprising exposing an input stream comprising 0.01 vol % to 25 vol % $CO_2$, relative to a volume of the input stream, to the sorbent bed at a second average sorbent bed temperature of 0° C. to 150° C. to adsorb $CO_2$, absorb $CO_2$, or a combination thereof, and to form a $CO_2$-depleted stream comprising 10 mol % or less of the $CO_2$ from the input stream.

7. The method of claim 6, wherein exposing the input stream to the sorbent bed and exposing the steam stream to the sorbent bed comprise a cyclic process, and wherein exposing the steam stream to the sorbent bed comprises exposing the sorbent bed to a molar amount of steam comprising 1.0 times to 20.0 times a maximum $CO_2$ capacity of the sorbent bed.

8. The method of claim 6, wherein exposing the steam stream to the sorbent bed comprises exposing the sorbent bed to a molar amount of steam comprising 1.0 times to 20.0 times a molar amount of $CO_2$ that was sorbed by the sorbent bed during the exposing the sorbent bed to the input stream.

9. The method of claim 6, wherein the input stream comprises a combustion flue gas.

10. The method of claim 6, wherein the input stream comprises a flue gas from a combustion zone of a power plant, and wherein the steam stream comprises steam generated by heat exchange with at least a portion of the flue gas.

11. The method of claim 1, wherein the absorbent comprising a Performance Index of greater than 150 $m^{-1}$.

12. The method of claim 1, wherein the absorbent comprises a liquid amine.

13. The method of claim 1, wherein the solid surface comprises a surface area of 0.001 $m^2/g$ to 45 $m^2/g$.

14. The method of claim 1, wherein the steam stream comprises steam generated by an exhaust of a standalone gas-fired steam turbine; or wherein the steam stream comprises steam generated by a boiler; or a combination thereof.

15. A system for sorption and desorption of $CO_2$ using a sorbent bed, comprising:
 a sorbent bed comprising a liquid amine absorbent infused or encapsulated on a solid surface, covering a solid surface, or a combination thereof, the sorbent bed comprising a first inlet, a steam inlet, a first outlet, and a desorption outlet;
 a combustion zone comprising a combustion outlet;
 a heat exchanger comprising a hot fluid inlet in fluid communication with the combustion outlet, a cooled fluid outlet, a water inlet, and a steam outlet, the first inlet of the sorbent bed being in fluid communication with the cooled fluid outlet, the steam inlet of the sorbent bed being in fluid communication with the steam outlet of the heat exchanger; and
 a liquid ring pump comprising an associated ring cooler in fluid communication with the desorption outlet, the liquid ring pump and associated ring cooler comprising a $CO_2$ outlet and a liquid water outlet.

16. The system of claim 15, wherein the absorbent comprises a Performance Index of greater than 150 $m^{-1}$.

17. The system of claim 16, wherein the solid surface comprises a surface area of 0.001 $m^2/g$ to 45 $m^2/g$.

18. The system of claim 15, wherein the steam inlet of the sorbent bed being in indirect fluid communication with the steam outlet of the heat exchanger via one or more steam turbines.

* * * * *